INVENTOR
WALTER M. BUDDE JR.
GALE W. MATSON
BY
ATTORNEY 2,993,920
RESINS AND METHOD OF MAKING THE SAME
Walter M. Budde, Jr., and Gale W. Matson, Minneapolis, Minn., assignors to Archer-Daniels-Midland Company, Hennepin, Minn., a corporation of Delaware
Filed Sept. 23, 1958, Ser. No. 762,805
18 Claims. (Cl. 260—404.8)

This invention relates to an improvement in the method of producing strong and hard thermosetting resins from selective long chain polyepoxides (or aliphatic oxirane compounds) having a plurality of internal epoxy groups and derived from vegetable, animal and marine oil sources, by cross-linking, with the anhydride of a polybasic acid and the improved plastic products derived therefrom. More particularly, the invention relates to an improvement in thermosetting resins formed essentially from non-conjugated unsaturated oil base material obtained from vegetable, animal and marine glycerides, which are poly-epoxidized and have an oxirane value of at least 8% and preferably of higher value and other esters derived from said glycerides, having an oxirane content of at least 7.8% and preferably over 8%, said epoxidized compounds being neutralized and each containing, as a critical necessity, from 10 up to 2000 parts per million of mono-valent alkali metal of group I, of the periodic table, a cross-linking poly basic acid anhydride component and preferably a quaternary ammonium halide catalyst or less desirably a tertiary amine catalyst.

The unsaturated natural oils of vegetable, animal and marine origin which serve as the basis of the epoxidized oils of this invention are classed as drying and semi-drying. These same oils after epoxidation do not set to form films or resinous plastics until they are treated as hereinafter described.

It is known that acid anhydrides or certain amines may be used as cross-linking and/or curing agents for epoxides of aryl compounds, where the epoxide group resides in the 1, 2 position; i.e. glycidyl polyethers of polyhydric phenols as disclosed in U.S. Patent 2,324,483. Otherwise, suggested attempts to obtain resins of satisfactory strength and hardness from epoxidized oils and epoxidized derivatives thereof have not been successful.

Particularly, suggested resinous systems based on epoxidized natural fatty oils have not yielded, to this time, practical resinous products of a commercially usable nature. The attempted resins made from epoxidized natural oils lacked the necessary strength to be applicable in the fields of lamination, casting and fabrication of articles of commerce associated with the plastics industry. In the case of laminates the shortcomings have been the inability to provide workable resin bonds for glass, rayon, cotton, nylon and other fibers. In this respect, the oil based resinous systems did not attain either an acceptable hardness for necessary abrasion and wear resistance or the required strength characteristics necessary to achieve a product resistant to fracture by impact or flex strains. It is further recognized that resin and polymeric systems of all types and character have been invented, suggested and proposed. These have not produced entirely satisfactory final products in some respects and principally lack strength, or lack the necessary combination of hardness and strength characteristics required for irregular shaped cast articles, such as corners for tubes and pipes, or rods and other objects formed of such plastics or used to encapsulate other items. This was generally true, whether the resin or polymeric system was used as a pure resinous mixture or in solvent and filler systems known to the trade. Further, difficulty is encountered in attempting to set resin masses due to internal strains and stresses built up during cure. For example, to date, bowling balls are known to be successfully prepared only of hard rubber, as we are aware of no completely economically satisfactory molding resin known therefor.

Accordingly, an object of this improvement is to provide for overcoming the above shortcomings through the use of natural oils which have been epoxidized to a value of at least 8% and preferably higher oxirane content, contain at least about 10 parts per million mono-valent alkali metal ion from group I of the periodic table and are catalytically cured with a suitable catalyst to give a final product with the cross-linking necessary to provide strong usable products of a Barcol hardness of at least about 0 and preferably about 18 or more.

Another object of this improvement is to provide a method for producing efficient resin systems derived from selectively treated epoxidized natural oils and selectively treated oil derived esters, affording a series of improved strong and hard resinous polymers for use in the plastics field.

Another object of this improvement to provide new improved resinous systems consisting essentially of the reaction product of treated epoxidized linseed oil material having an oxirane value of over 8%, cured with an anhydride cross-linking agent and the method of obtaining the same.

Another object of this improvement is to provide a method for producing new resinous systems of epoxidized esters, derived from acids of semi-drying and drying oils having an oxirane content of at least 8% with an anhydride cross-linking agent and the products obtained therefrom.

A further object of this improvement is to provide new resinous compositions from epoxidized long chain fatty acid esters of about 8% oxirane value and containing 10–2000 parts per million of alkali metal ions and an anhydride of a polyfunctional acid in the presence of a suitable catalyst.

The accompanying drawings are illustrative of evaluations wherein.

To the accomplishment of the foregoing and related ends, this improvement then comprises the features hereinafter more fully described and particularly pointed out in the claims. The following description setting forth in detail certain illustrative embodiments of the improvements, these being indicative, however of but a few of the various ways in which the principles of the improvement may be employed.

The known epoxy compounds now finding wide use in the resin fields are polymers with external oxirane groups, i.e., in terminal positions. The cross-linking reaction is accomplished by use of anhydride or amine curing of polymeric epoxides throughout the external oxirane groups. Illustrations of these are the well-known alkaline condensation products of epichlorohydrin with 2,2-bis-(4-hydroxyphenyl) propane (Epon Resins-Shell) and related products and those prepared by the polymerization of di- vinyl benzene monoepoxide as per (U.S. Patent 2,807,599) which have structures of the following character:

Formula 1

These polymeric epoxides are subsequently cross-linked to give the final resinous product.

Formula 2 shows another monomeric epoxide known to the trade:

3,4-epoxy-6-methylcyclohexylmethyl-3,4-epoxy-6-methyl cyclohexanecarboxylate

Formula 2

The materials of Formulas 1 and 2 are not derived from vegetable, animal or marine sources. By nature of the molecular configuration it would be expected to give products differing from epoxidized compounds derived from fatty oil sources which have a different molecular structure as illustrated by the following:

Formula 3

Epoxidation products of naturally occurring oils, the glycerol esters, as herein contemplated, constitute the epoxy component used for the final resins. Although this epoxy component contains more than one oxirane group, as a material in itself, it is considered a monomeric epoxide rather than a polymer as shown in Formula 1 and is different from the epoxide shown in Formula 2.

Formula 3 shows an epoxidized linoleic residue. This is used only in an illustrative sense, since the disclosure will further define specifically those compounds which have been found to yield acceptable products. The groups R and R' are other acyl radicals of the naturally occurring oils in which the unsaturation has been epoxidized.

The properties of the final polymers after cross-linking may differ, although an anhydride curing is used. The 1,2-epoxides, by their nature, necessitate end group cross-linking due to the external oxirane groups, with or without internal cross-linking. Epoxidized natural oils and their derived esters necessitate internal cross-linking without end group cross-linking, due to the internal position of the oxirane group, none of which reside in the terminal positions. Hydroxyl groups, arising from oxirane cleavage during the epoxidation, also participate in the cross-linking in the internal positions. The following Formulas 4 and 5 illustrate the different structures:

Final polymer (small portion shown) ↓

Formula 4

Final polymer (small portion shown)

Formula 5

The structural presentation is shown in simplified form and the interactions of existing hydroxyl groups are omitted for clarity. Also omitted is the possible formation of an ether linkage through interaction of hydroxy and oxirane groups.

Formula 4 shows a simplified structure of the molecule formed, using a di-epoxide whose oxirane groups lie in terminal positions (i.e.; alkaline condensate of epichlorohydrin with bis-phenol A). Acyl radicals may also be attached to epoxy residues. The values of (X) and (Y) are respectively the number of epoxide rings and anhydride groups. The values of X and Y are generally set up in such a manner, either by calculation based on the oxirane content or empirically by experimentation, to yield a resin in which the oxirane and anhydride units have reacted to yield the type product indicated. The molar ratios used, Y/X, are generally between 0.5 and 1.0 or one anhydride group per one to two oxirane rings. In practice these figures vary due to the amount of free hydroxyl and extent to which ether formation takes place. R and R' simply represent the remaining portion of the epoxy and anhydride molecules.

Formula 5 serves to illustrate the type of polymeric molecule herein obtained using polyepoxides with the epoxide group in internal positions. Two glycerol ester molecules are shown using one epoxidized acid residue from each in the cross-linkage presentation. The remaining R groups are other acyl groups of natural oil molecules whose unsaturation has been epoxidized. These may also enter into the cross-linking reaction. The acyl groups remaining are also linked to epoxy groups. R' represents the remaining portion of the anhydride molecule. The values of (X) and (Y) have the same significance as in Formula 4. Although the epoxidized form of the linoleate molecule is shown it is intended in no way to restrict the use of other epoxidized acid radicals in the glycerol ester molecule; it is used only as an illustration.

In Formula 5, it can be seen that each 18 carbon oil residue leaves, after cross-linking, a normal aliphatic chain of five carbon atoms free to rotate. This is not true of a polymer as represented by Formula 4. Thus, polymers derived from epoxidized natural oils should be slightly softer even though the total cross links may be similar.

These explanations are presented to show the portion of the structure which imparts major differences in thermoset resins derived from terminal oxirane containing polymeric polyepoxides and a plurality of non-terminal oxirane containing monomeric polyepoxides derived from fatty oil sources.

With regard to mechanism of the reaction, there are to be considered other factors such as possible first reaction of the anhydride with hydroxyl, followed by reaction of the resultant half ester-acid with an oxirane to form a full ester and hydroxyl group, which latter group further reacts with another anhydride to begin the cycle anew. After reaction that may enter, is probably the hydroxyl-epoxy interaction to form an α-hydroxy ether leaving the α-hydroxy group to react further in both of the above ways.

As indicated, acid anhydrides may be used alone to cure epoxidized systems. However, for polyepoxidized fatty oil material, longer cure time or higher cure temperature must be used to achieve desirable characteristics of the final product. Under accelerated conditions needed, the final polymer often lacks good color and desirable strength in comparison with the same system cured in the presence of catalysts. Thus, for anhydride systems in which the anhydride is of low reactivity the properties of the final product, either for use in castings or laminations, will be enhanced through the selective use of a catalyst system in combination with the treated polyepoxides, as herein set forth.

In our improvement, the preferred catalyst systems utilized are quaternary ammonium halides. Their behavior, with internal oxirane oxygen in comparison to other catalyst systems such as tertiary amines, organo substituted phosphines, arsines, stibines and bismuthines, was wholly unexpected. Catalysts in general may be considered as activators for the anhydride component of the mixture. The fact that these quaternary salts are excellent catalysts for curing a fatty oil epoxy system makes it possible to postulate a mechanism for the catalytic behavior of all classes of catalysts used for the promotion of these internal poly-oxirane-anhydride cross-linking reactions.

Our data shows that quaternary ammonium salts decrease gel times, in some cases by approximately one-half, of that observed for tertiary amines, with the exception of pyridine compounds, or compounds which are effective due to their resonant structure. The catalytic effect is probably that of opening the anhydride ring to form a polar molecule which reacts with hydroxy groups and the internal epoxy groups of the oxirane compound which is to be cross-linked.

In the uncatalyzed reaction the anhydride is believed to react first with free hydroxyl groups. Although many plausable mechanisms have been postulated it is quite likely that, due to molecular polarization and polarizability, the molecules become oriented in such a way that a simultaneous attack of the negative portion of the anhydride on the positive portion of the hydroxy compound, and, similarly in the case of the positive portion of the anhydride and negative portion of the hydroxy compound take place.

The above discussion is further illustrated by the following concepts. Thus, Formula 6 illustrates the last mentioned.

Formula 6

This leaves a half ester-acid of the anhydride to react further with an oxirane ring present, as follows:

Formula 7

This produces a free hydroxyl for further reaction to open an anhydride ring causing this process to repeat again and again until completion.

This normally very slow process is accelerated by elevated temperatures. However, the elevated temperatures necessary, sometimes causes undesirable effects due to molecular breakdown. There is also a competing slow reaction of ether formation, whereby oxirane-hydroxyl reactions form ethers, as follows:

Formula 8

The function of the catalyst in these systems is to accelerate the anhydride reaction by converting the anhydride to a more reactive entity or complex by opening or partially opening the anhydride ring in such a manner as to increase the negative charge on the anhydride oxygen. In the following formulary and discussion completely opened forms are used in depicting the effect of catalyst on the anhydride ring, however, the effect may be one of only increasing charge separation; i.e., a polarizability effect in which the catalyst approaches the anhydride molecule causing the electronic deformation necessary prior to actual ring opening but with the reaction to form an ester taking place under these influences, before the ring is completely opened.

In the case of amines, their negative nature is due to an unshared electron pair which is operative in the catalysis. This may be illustrated, as follows:

group which causes a charge separation in the molecule. This may be illustrated, as follows:

Formula 10

The structure depicting the addition of the amine to the anhydride would be expected to be a very unstable entity with equilibrium far to the left, (Formula 9). However, reaction with the hydroxyl group causes the reaction to Formula 9

As stated, the open ring structure is not necessary. It may be the approach of the tertiary amine to the carboxyl proceed to completion at a rate faster than that for the uncatalyzed system.

In the case of pyridine systems the equilibrium of the first step lies much greater to the right due to the following resonance considerations:

Formula 11

These extra resonance forms lend stability to the intermediate, thus increasing its possibility for existence. In the initial attack the pyridine nitrogen is also more negative than that found on non-cyclic tertiary amines. The opened or partially opened anhydride ring will then react with the alcohol group as before. From these illustrations the unexpected additional catalytic effect of the preferred quaternary ammonium salts can be more clearly shown.

In the case of the quarternary salts, a tri-alkyl ammonium chloride is used as an example. The attacking entities themselves are charged with a position of high electron density, as follows:

Formula 12

From the sequence it can be seen that the catalytic effect from a quaternary salt can be explained, not in the same manner as that for amines, but more in line with acid catalysis. Thus, it can be further seen that the effect of quaternary salts was quite an unexpected discovery and places quaternary ammonium salts out of the realm of normal amine catalysts. Another effect may also be felt, dealing with a "quasi" acid catalyst, namely, that of complexing with the oxirane ring to loosen the bonding in the following manner:

facilitating an easier attack by the anhydride.

Due to these differences it is impossible to pre-conceive the idea that quaternary salts may be better than amines inasmuch as the basic mechanistic effects are different. Further, the quaternary salt does not break down in the reaction to a tertiary amine but acts as the quaternary.

Acid catalysts, in general, have not been shown to be effective, not due to lack of catalytic effect, but due to an excessive catalytic effect. For example, hydrochloric, phosphoric and sulfuric acids and the like break down the system at too fast a rate, giving immediate gellation at the point of contact and improper cure. Whereas, quarternaries, although not actually acids in themselves, act catalytically when heated in the presence of the heated epoxidized compounds and anhydrides, without causing breakdown or internal strain and stress. Through their catalytic action they make curing possible under less vigorous conditions, and produce a hard resin product from the preferred epoxy compound without internal stress and strain and of better color and other improved physical characteristics.

The poly-epoxy compounds, as described herein and which are converted to hard resins, can be initially prepared by epoxidation of the internal ethylenic groups in unsaturated aliphatic chains under optimum conditions and by careful control under any one of the methods known in the art. This comprises careful reaction of the unsaturated compounds, in solvent and other systems, with peracids, such as performic, perbenzoic, peracetic, peracids formed "in situ" using hydrogen peroxide with acid or resin catalysts, or "in situ" from aldehydes or their precursors. These means of epoxidation in no way restrict the claims of this disclosure.

After epoxidation of the natural glyceride oils or their derived esters, by a suitable process, the epoxidized products are, of a critical necessity, treated with a carbonate, bi-carbonate, or other readily removable soluble salt forming ion of the mono-valent alkali metals from group I, of the periodic table, e.g., sodium, potassium, and lithium and preferably the sodium or potassium. The polyvalent alkali earth metals are unsatisfactory. In each instance, the acid value of the epoxidized fatty oil material is determined and then the alkaline salt in a slight excess over the equivalent amount is added to obtain from 10 to 2000 parts per million alkali metal ion concentration in the final product.

The preceding discussion is in no way intended to limit our system using neutralized and alkali containing poly epoxidized fatty glyceride oils and polyepoxidized long chain fatty oil base materials having an oxirane value of preferably over 8%, as indicated, with anhydrides and preferably with a catalyst for the preparation of usable resins and plastics. The epoxidized compounds hereinafter illustrated are from oil base materials containing a plurality of internal oxirane oxygen groups, within the critical oxirane values, as indicated and containing from at least about 10 to 2000 parts per million of a monovalent alkali metal of group I.

The material, epoxidized, limits the usefulness of the final product. The limitation imposed is due to the number of active oxirane groups in the molecule, as hereinafter illustrated. The degree of cross-linking of the final polymer is dependent on the number of internal oxirane groups to be cross-linked for obtaining essential strength with hardness. This functionality is dependent upon oxirane value which must be at least on the order of 8% for the ester derivatives and at least 8% and preferably higher for the epoxidized oils, in order to obtain optimum hardness and strength, as herein demonstrated.

The limiting factor in resin quality is related to the final oxirane content of the oil which is a direct function of the initial unsaturation present in the base natural oil. It is also important to consider the distribution of unsaturation in a base material. An oil high in polyunsaturates and high in saturates gives a high average value of unsaturation but is not as acceptable even though highly unsaturated, because of uneven distribution of unsaturation. For acceptable cross-linking, it is important that the base oil be low in saturates. Highly conjugated oils are also unsatisfactory, due mainly to problems involved in epoxidation of conjugated systems by epoxidation methods now known. However, with future developments of successful epoxidation techniques this may be overcome. The most non-conjugated unsaturated base oils are linseed, perilla, walnut, safflower, hempseed, and winterized or de-stearinized marine oils such as menhaden and sardine. In general, the base unsaturated fatty radical of the oils contains from 12 to 26 carbon atoms and all possess iodine values greater than 140. Of the less acceptable oils, the more important are corn, mustard, rapeseed, poppyseed, soybean, peanut, cotton and tallow. Tung, oiticica and dehydrated castor oils possess sufficient unsaturation but, at present, are unacceptable since unsaturation is conjugated. In general, our work indicates that it is necessary to have an iodine value higher than 140 to form acceptable resins. For superior quality products an iodine value of approximately 180 or more is preferred. Thus, it is possible to upgrade most natural oils by removing saturates to achieve these levels. The saturates in the glyceride esters and oil derivatives, as indicated, are essentially removed before epoxidation. For example, a solvent or other extraction process, as described in the reviewed literature by Alfred E. Rheineck's publication "Recent Advances in the Technology of Drying Oils" from "Progress in the Chemistry of Fats," vol. V (1957), Pergamon Press, is utilized to provide acceptable fatty acid glycerides and other long chain aliphatic esters. When upgraded, the base oils and esters have improved iodine value (I.V.) and provide higher oxirane values when epoxidized under optimum conditions of concentration of reactants, suitable catalyst, temperature and time, in a suitable process, as indicated.

The terms, curing, hardening or cross-linking agents are equivalently used herein. These agents are a group of anhydrides, derived from polybasic acids and give excellent results by forming polymers through their reactions with epoxy and hydroxyl groups. The anhydrides may be aliphatic, aromatic, heterocyclic, cycloaliphatic, unsaturated or saturated and may be either intermolecular or intramolecular or mixed acid anhydrides. Examples of these anhydrides include maleic, chlormaleic, succinic, citraconic, and alkyl and alkenyl substituted succinic anhydrides. The latter are typefied by octyl, dodecyl, octenyl, dodecenyl, and octadecenyl groups. Others are polyadipic acid anhydride, polyterephthalic acid anhydride, polyazelaic acid anhydride and polysebasic, and polyisosebasic acid anhydrides. The aromatic anhydrides may be pyromellitic di-anhydride, phthalic, and variously substituted phthalic anhydrides such as mono-, di-, tri- and tetrachlorophthalic anhydrides. Cycloaliphatic anhydrides include compounds such as tetra- and hexahydrophthalic anhydride and other cyclic and substituted cyclic anhydrides. Diene synthesized anhydrides may also be used such as bicyclo-(2,2,1)-hept-5-ene-2,3-dicarboxylic acid anhydride and methylated and otherwise substituted derivatives; 3,4,5,6,7,7-hexachloro - 3,6 - endomethylene - 1,2,3,6 - tetrahydrophthalic anhydride; and maleic anhydride Diels Alder adducts derived from compounds such as eleostearic-acid-esters, and succinic acid anhydrides derived by reacting maleic anhydride with non-conjugated unsaturated fatty acids and their esters, and the like.

Acceptable catalysts for the curing process have been found to be tertiary amines as pyridine, γ-picoline, dimethyl-octadecylamine, benzyldimethylamine, trilaurylamine, 2 methyl-5 ethyl pyridine, N-methyl morpholine and the like. The preferred quaternary ammonium halide catalysts are alkyl pyridium chlorides, dodecyltrimethyl ammonium chloride, di-stearyl di-methyl ammonium chloride, and lauryltrimethyl ammonium chloride. The quaternaries do not have the volatility and toxicity problems associated with pyridine compounds and tertiary amines. These are used in ranges of about .75% to about 2%, with 1% to 1.5% as the preferred range based on the anhydride and the epoxidized fatty oil components.

Other general catalysts of the $BF_3$ complex types, i.e., $BF_3$-piperidine, and those enumerated in Parry et al. 2,824,083 are also acceptable, only in some instances, for example, as hereinafter illustrated.

The final resins obtained are very stable due to their structure and show very low sensitivity to water, alkalies or acids. The reaction is primarily one of addition polymerization and condensation. The curing procedure is achieved by mixing the epoxidized oil material and anhydride, with the catalyst, followed by a heat cure at temperatures greater than 125° F. for varying periods of time dependent on the activity of the anhydride, solubility factors and convenience of operating conditions. The reaction proceeds successfully at lower temperatures, but the time for complete cure is then increased. Cure can be achieved in intimate contact with water. The ratio of moles anhydride used per moles oxirane present generally falls between 0.5 to about 1.0. The ratio can be conveniently determined empirically by setting up a series using different hardener levels, curing the system and determining weight loss on further treatment at 400° F. for 24 hours after initial cure. At the point where excess anhydride is present the weight loss will increase, thus giving a plot of anhydride/epoxy versus weight loss a rapid decrease to minimum. The optimum ratio is at a point prior to the rapid decrease.

All plastic formulations are very compatible with fillers due to the high wetting powers and inherently low viscosity of the systems derived from the mixtures of epoxidized unsaturated oils and anhydrides. The fillers may be added in any proportions desired for the particular purpose and the formulated resin set in the conventional manner.

Figure 2:
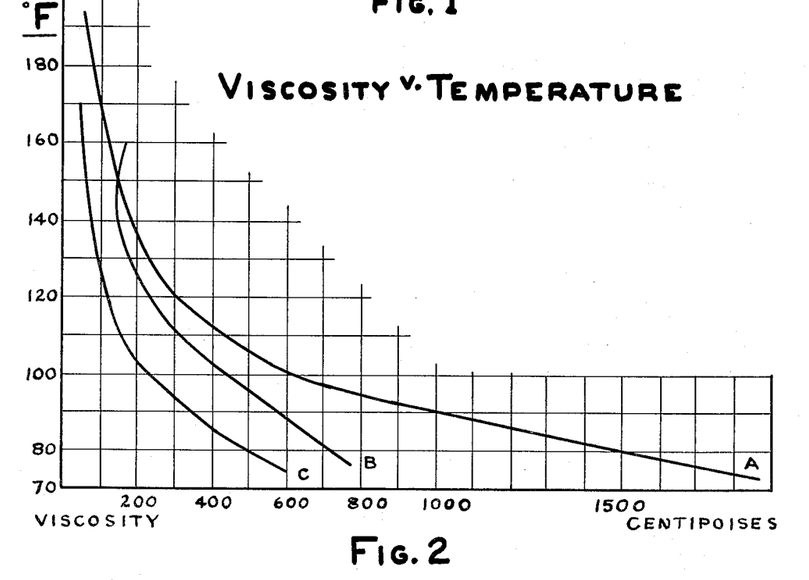
FIG. 2, illustrates temperature viscosity curve characteristics of epoxidized oil and anhydride blends useful in castings and laminates.

The temperature viscosity characteristics of the epoxy-anhydride blends are desirable for work in both castings and laminates both with or without fillers. The temperature viscosity curves, as shown in FIGURE 2, illustrate these factors, as follows:

*Viscosity curve A.*—This curve shows the temperature viscosity characteristics of an epoxidized linseed oil prepared by using sulfonic ion resin, "Dowex" 50 X 8, catalyst, glacial acetic acid and hydrogen peroxide. The epoxide content was 8.27% and contained 11 parts per million sodium ion, added as sodium carbonate.

*Viscosity curve B.*—This curve shows the temperature viscosity characteristics of a typical resinous mix containing 22.25% hexahydrophthalic anhydride, 22.25% monochlorophthalic anhydride and 55.5% epoxidized oil of the same batch as curve A, when catalyzed with 1% di-stearyl di-methyl ammonium chloride. The anhydride to oxirane mole ratio in this example is 0.92.

*Viscosity Curve C.*—This temperature viscosity curve shows the viscosity of one batch of sodium ion (15–20 parts per million) containing epoxidized linseed oil (oxirane value 9.17%) prepared by using a toluene solvent system with a resin bed catalyst (e.g. Dowex 50 X 8), acetic acid and hydrogen peroxide for the epoxidation.

The Barcol hardness values which are mentioned in the following examples were determined by the "Barcol Impressor GY 23–934–1" designed for testing hardness of soft metals such as aluminum and its alloys, brass, copper and the harder plastics which are used in laminating and casting materials.

The preferred epoxidized natural oils utilized in the examples of this disclosure may also be prepared by the mixed acetic acid and formic acid process disclosed in the copending application of Hansen et al., Ser. No. 670,386 for Epoxidation Process and of a critical necessity are neutralized and treated to contain at least 10 parts per million monovalent alkali metal with not less than 8% and preferably over 8% in oxirane value, as indicated.

The following non-limiting examples are illustrative of the embodiments of this invention. Essentially, they illustrate the method of preparation of the plastic composition and show the plastics properties as they are governed by the base materials. The use of the plastics, for particular application, is ultimately governed by their physical characteristics e.g. hardness, resiliency, shrinkage resistance, dielectric properties, strength characteristics and the like, as will be recognizable to the man skilled in the plastic and molding art.

EXAMPLE I

*Effect of oxirane content on plastic (Barcol) hardness*

Natural oils epoxidized to oxirane contents varying from 6.4% to about 9½%, neutralized and containing 10-200 parts per million sodium as the alkali metal ion, derived from the addition of an excess of sodium carbonate, where cured using a mixture of equal parts of monochlorophthalic anhydride (MCP) and hexahydrophthalic anhydride (HHPAA) as the hardener. The hardener level was determined as 0.80-1.00 moles anhydride per mole oxirane value of the epoxidized oil. The anhydride mixture was dissolved in the epoxidized oil with heating sufficient to bring about a homogeneous solution, followed by addition of 1% di-stearyl di-methyl ammonium chloride. As set forth in Table 1, various treated epoxidized materials were prepared by the above formulation, and formed as ⅛" sheet castings and cured for 16-18 hours at 250° F.

TABLE 1.—RELATIONSHIP OF OXIRANE CONTENT AND BARCOL HARDNESS

| Base Oil type | Percent Oxirane Attained | Epoxide Equivalent [1] | Anhydride, Parts/100 Epoxide | Mole Ratio, Anhy./Oxirane | Barcol Hardness |
| --- | --- | --- | --- | --- | --- |
| Soybean | 6.4 | 250 | 66 | 0.99 | 0 |
| Safflower | 7.1 | 225 | 74 | 1.00 | 7 |
| Linseed | 7.4 | 216 | 70 | 0.91 | 12 |
| Do | 8.3 | 193 | 80 | 0.93 | 18-20 |
| Do | 8.3 | 193 | 70 | 0.81 | 18-22 |
| Do | 8.4 | 190 | 80 | 0.91 | 17-22 |
| Do | 9.2 | 174 | 80 | 0.83 | 18-19 |
| Do | 9.2 | 174 | 96 | 1.00 | 23 |

[1] Number grams epoxide equivalent to one oxirane oxygen (16 gm. O).

Figure 1:
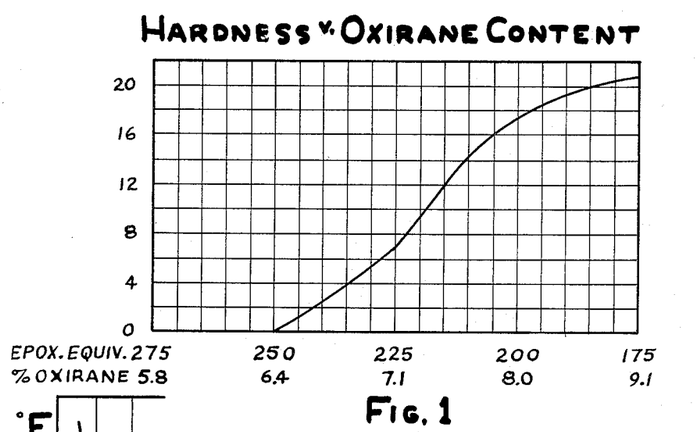
FIG. 1, is a graph which shows the relationship of oxirane values, or epoxy equivalency, to hardness characteristics.

These data are illustratively shown in FIGURE 1. The critical 8% and higher range of oxirane content (epoxide equivalent of less than 200) for obtaining a Barcol hardness in the range of about 18 or higher for this anhydride system as illustrated by the leveling of the curve. In some instances a somewhat lower Barcol hardness may be satisfactory for some purposes and can be obtained by a change in formulation when utilizing an epoxidized oil material having an oxirane value of not less than 8%, as hereinafter exemplified.

The formulation change which is acceptable involves utilizing different anhydrides, rather than using lower oxirane oil, as hereinafter shown in Examples XII, XIII, and XV. This point may be illustrated by the system of Example XII, wherein 120 parts dodecenyl succinic anhydride with 100 parts epoxidized linseed oil (8.3% oxirane), gives a tough, durable, semi-flexible sheet with zero Barcol hardness. If however, the system utilized oil with an oxirane value of less than 8% the product would not have sufficient strength and were easily chipped and very easily broken as was the hard oil products of Example I having below the 8% oxirane value. Thus, the data of Example I, in no way restricts this disclosure in respect to Barcol hardness of final products other than for the specific anhydride system illustrated therein, but is restrictive in regard to the epoxidized oils used in the formulations. That is, the oxirane content of the epoxidized linseed oil used must be greater than 8% to achieve hard and strong products. This is also a necessary value for optimum strength of other oils, as such.

EXAMPLE II

*Effect of uncatalyzed vs. catalyzed systems on speed of cure*

This example illustrates the use of 3,4,5,6,7,7-hexachloro-3,6-endomethylene-1,2,3,6-tetrahydrophthalic anhydride (HET) as anhydride for the curing of epoxidized linseed oil (8.3% oxirane value) containing 11 parts per million sodium. The molar ratio of anhydride to oxirane was 0.65. HET anhydride, 125 parts, was added to 100 parts of the said epoxidized oil with heating and stirring until solution was achieved at about 180° F. This uncatalyzed mixture cured at 250° F. to a hard strong casting which was very durable and clear. After six hours of cure the hardness attained a Barcol of 8 and after 19 hours of cure it attained a Barcol hardness of 18.

This same composition was repeated with the addition of 1% di-stearyl di-methyl ammonium chloride by weight, as a quaternary ammonium halide catalyst.

With a cure at 250° F. the mixture set up almost immediately to give the following Barcol hardness readings: ½ hour, 15; 1½ hour, 17; 3 hours, 20; 6 hours, 22; and, 19 hours, 22.

EXAMPLE III

This example illustrates the use of a mixture of 3,4,5,6,7,7-hexachloro-3,6-endomethylene-1,2,3,6-tetrahydrophthalic anhydride (HET) with hexahydrophthalic anhydride (HHPAA) for the curing of an epoxidized linseed oil, neutralized and containing 11 parts per million sodium. About 115 parts of a melted mixture of equal parts of HET and HHPAA were added with stirring at 140° F. to 100 parts mono-valent alkali metal containing epoxidized linseed oil with 8.3% oxirane. Molar ratio of anhydride/oxirane =1.02. The uncatalyzed mixture cured at 250° F. gave a hard, durable, clear casting with a Barcol hardness of 10 after 21 hours.

This was repeated with the addition of 1% di-stearyl dimethyl ammonium chloride as the catalyst. With a cure at 250° F. the mixture set up in about 6 minutes to give the following Barcol hardness readings: 5 hours, 8; 8 hours, 17; and, 21 hours, 26. The last test sample had a specific gravity of 1.23.

EXAMPLE IV

*Curing effects of various catalysts on gel time*

The effect of a variety of catalysts at 1% concentration was noted for an epoxidized linseed oil of 8.3% oxirane value, neutralized and containing 11 parts per million of sodium ion in admixture with anhydride in mole ratio, anhydride/oxirane of 0.99. The test tube gels were run at the temperature of 320° F. in a General Electric Gel-Time Meter. The following gel times are in minutes. The gel time is the interval of time elapsing from placement in the 320° F. bath until gelation takes place.

TABLE 2.—RELATIONSHIP OF GEL TIME AND CATALYST

| Type | Gel Time, Minutes | Catalyst |
| --- | --- | --- |
| Tertiary Amines | 5.4 | pyridine. |
| | 13.5 | 1(2-hydroxyethyl)-2-heptadecenyl-2-imidazoline. |
| | 15.2 | di-methyl-octadecyl amine. |
| | 17.0 | benzyl dimethyl amine. |
| | 22.3 | N,N-dimethyl cyclohexyl amine. |
| | 24.7 | tris-dimethylamino phenol. |
| | 24.8 | N-methyl morpholine. |
| Quaternary Salts | 7.5 | di-methyl-di-coco-ammonium chloride. |
| | 9.8 | di-methyl-di-stearyl-ammonium chloride. |
| | 7.7 | di-isobutyl phenoxy ethoxy ethyl dimethyl benzoyl ammonium chloride. |
| | 1.4 | BF₃-piperidine complex. |

These results show acceptable catalysts. The superiority of pyridine, in time of cure, compared to other tertiary amines, is offset by the factor of final quality and color of the product. However, in some instances that may not be objectionable. The catalyst system used is determined by qualities desired in the final product. In cases of highly reactive anhydrides, catalyst systems are not necessary and may, in some cases, be harmful. Otherwise, the catalyst system, including time and temperature, may be varied by requirements of the specific system. For example, the boron trifluoride-piperidine complex gel time at 320° F. is short but the product, as a final resin, is subject to decomposition on heating between 300–400° F. An addition like sample cured at a temperature level below 300° F. and on the order of 250° F. obtained a product which was not decomposed by the heat so long as it was maintained below 300° F. Consequently, for higher temperature conditions this complex is not desirable.

EXAMPLE V

*Curing effect of various catalysts on Barcol hardness*

This example illustrates the effect of cure based on Barcol hardness obtained using quaternary ammonium halides as catalyst for the epoxidized oil resin systems. The resin systems comprised 61.5 parts by weight monochlorophthalic anhydride (MCP) mixed with 100 parts epoxidized linseed oil; oxirane value 8.3% and containing 11 parts per million sodium ions. The mole ratio anhydride/oxirane is 0.65. The components were heated to about 140° F., followed by the addition of 1% catalyst, based on total weight. Samples weighing 25 g. cured at 350° F.

TABLE 3.—RELATIONSHIP OF HARDNESS AND CATALYST

| Catalyst | Barcol Hardness | Cure Time (hours) | Color |
|---|---|---|---|
| None | very soft | 1 | very good. |
| Do | soft | 2 | Do. |
| di-stearyl-methylamine | 6 | 1 | good. |
| Do | 8 | 2 | Do. |
| di-stearyl-dimethyl ammonium chloride | 12 | 1 | very good. |
| Do | 16 | 2 | Do. |
| coco-pyridinium chloride | 10 | 1 | Do. |
| Do | 16 | 2 | Do. |
| pyridine | 12 | 1 | poor—black. |
| Do | 17 | 2 | Do. |

These results show that the quaternary catalyzed system achieves a higher degree of cure, based on Barcol hardness, for a given cure time than the same system catalyzed by the amine from which the "quat" was derived. By quaternizing a pyridine compound the degree of cure was slightly decreased and a notable improvement in color was achieved which indicates that the catalytic effect is no longer that of pyridine, but is the effect of the quaternary ammonium halide derived from pyridine.

EXAMPLE VI

*Effects of reactivity of anhydride cross-linking agents*

The reactivity of the system as a whole may be varied by the use of mixtures of highly reactive and less reactive anhydride cross-linkers. Table 4 illustrates this effect by the gel time data determined on 25 gm. samples immersed in a constant temperature bath at 250° F. The anhydride and epoxidized linseed oil (8.3% oxirane) containing 11 parts per million sodium ions along with 1% di-stearyl dimethyl ammonium chloride, as the catalyst, were mixed at room temperature. The gel time is the interval of time elapsing from placement in a 250° F. bath until gelation takes place.

The following data shows quite clearly that there is a wide variance in the reactivity of different anhydrides and that blends may be used to achieve the desired system where the molar ratios were varied. It was found from weight loss data that the amount of anhydride necessary for complete reaction is less for the more reactive anhydrides such as 3,4,5,6,7,7-hexachloro-3,6-endomethylene-1,2,3,6-tetrahydrophthalic anhydride (HET) and monochlorophthalic anhydride (MCP) than is necessary for the less reactive anhydrides such has hexahydrophthalic anhydride (HHPAA), dodecenylsuccinic anhydride (DDSAA), and methyl 3,6-endo-methylene 4-cyclohexene 1,2-dicarboxylic anhydride (MNA) or methyl anhydride "Nadic" (product of General Aniline and Film). Also, when HET is used with HHPAA the gel time diminished from about 65 to 5½ minutes.

TABLE 4.—RELATIONSHIP OF GEL TIME AND REACTIVITY OF ANHYDRIDES

| Anhydrides | | Anhydride, Parts/100 Epoxide | Mole Ratio, Anhy. oxirane | Gel Time, Minutes at 250° F. |
|---|---|---|---|---|
| Type | Proportions | | | |
| HET | | 125 | 0.65 | 3¼–3½. |
| HET/HHPAA | 75/25 | 100 | 0.65 | 4. |
| HET/HHPAA | 50/50 | 115 | 1.02 | 5½. |
| HET/HHPAA | 50/50 | 90 | 0.80 | 6. |
| HET/HHPAA | 25/75 | 90 | 0.97 | 11½. |
| HET/HHPAA | 25/75 | 70 | 0.75 | 13½. |
| HHPAA | | 80 | 1.00 | 65. |
| MCP | | 80 | 0.85 | 6 (19 min. 200° F.; 35 min. 200° F. No Cat.). |
| MCP | | 60 | 0.64 | 6 (21 min. 200° F.; 55 min. 200° F. No Cat.). |
| MCP/HHPAA | 75/25 | 80 | 0.88 | 7½. |
| MCP/HHPAA | 50/50 | 80 | 0.92 | 12. |
| MCP/HHPAA | 25/75 | 80 | 0.97 | 17. |
| HHPAA | | 80 | 1.00 | 65. |
| DDSAA | | 120 | 0.87 | 75. |
| MNA | | 80 | 0.87 | 90. |

EXAMPLE VII

*Use of epoxidized non-glycerol esters*

This example illustrates the use of the pentaerythritol ester of linseed fatty acids (I.V.=167) rather than the triglyceride as in the previous examples. Mono-valent alkali, about 15 parts per million sodium, was added to epoxidized pentaerythritol ester (oxirane=7.95%). The ester was then blended at 150° F. with 70 parts monochlorophthalic anhydride to give a molar ratio of anhydride/oxirane=.77 and 1% by weight distearyl dimethyl ammonium chloride.

The blended composition yielded a ⅛″ sheet casting with a Barcol hardness of 20 upon cure at 250° F. for 18 hours.

EXAMPLE VIII

*Use of epoxidized esters of long chain fatty acid materials*

This example illustrates the use of the trimethylolethane ester of linseed fatty acid (I.V.=168). An epoxidized linseed trimethylolethane ester with a concentration of sodium ion about 15 parts per million and containing oxirane content of 7.81% was cured using 70 parts monochlorophthalic anhydride based on 100 parts oxirane ester, mole ratio of anhydride/oxirane is .79, and 1% by weight distearyl-dimethyl ammonium chloride was blended at 150° F. This yielded a ⅛″ sheet casting with a Barcol hardness of 17 upon cure at 250° F. for 18 hours.

EXAMPLE IX

*Preparation of glass cloth laminates*

Laminates consisting of 12 plies of "181 Volan A" (methacrylato-chromic chloride treated glass cloth sheets) were impregnated with mixtures of epoxidized linseed oil with an oxirane value 8.3% and 10–50 parts per million of sodium ion, various anhydrides, and with and without catalysts. The plies were overlaid and subjected to press cure. Thickness of cured panels was ⅛ inch. The mixtures were prepared in the manner indicated in Example I.

TABLE 5

| Parts Anhyd./100 Parts Epoxy | Mole Ratio, Anhy./oxirane | Catalyst [a] | Hours Post Cure | Flexural Strength I [b] | Flexural Strength II [b] | Flex. Modulus ×10⁶, p.s.i. |
|---|---|---|---|---|---|---|
| 91 MNA | 0.98 | A | [c] 1 | 52,300 | 40,800 | |
| 120 DDSAA | 0.87 | D | [g] 16 | 38,300 | 26,000 | 1.89 |
|  |  |  | [h] 200° F. | 37,400 | 30,100 | |
|  |  |  | [h] 300° F. | 37,800 | 29,600 | |
| 80 HHPAA | 1.00 | B | [c] 16 | 56,500 | 50,800 | |
| 120 HET | 0.63 | None | [c] 1 | 52,500 | 35,500 | |
| 70 MCP | 0.74 | D | [d] 16 | 48,300 | 33,040 | 2.31 |
|  |  |  | [h] 300° F. | 44,100 | 33,500 | |
| 60 HHPAA 40 HET | 0.96 | A | [c] 1 | 53,100 | 45,600 | |
| 60 HHPAA 40 HET | 0.96 | B | [c] 16 | 58,100 | 52,600 | |
| 60 HHPAA 40 HET | 0.96 | C | [c] 16 | 53,100 | 47,200 | |
| 60 HHPAA 40 HET | 0.96 | D | [c] 16 | 52,500 | 46,400 | |
| 60 HHPAA 40 HET | 0.96 | E | [c] 16 | 65,300 | 59,500 | |
| 67.5 HHPAA 22.5 HET | 0.97 | D | [d] 16 | 54,100 | 47,600 | 1.90 |
|  |  |  | [h] 250° F. | 51,300 | 48,600 | |
|  |  |  | [h] 300° F. | 53,100 | 45,100 | |
| 57.5 HHPAA 57.5 HET | 1.02 | D | [d] 16 | 50,500 |  | 2.24 |
| 50 HHPAA 50 HET | 0.89 | D | [d] 16 | 48,950 | 40,175 | 1.94 |
|  |  |  | [h] 300° F. | 52,300 | 48,000 | |
| 40 HHPAA 40 HET | 0.75 | D | [d] 16 | 48,950 | 40,175 | |
| 60 HHPAA 40 PMDA | 1.45 | A | [e] 16 | 47,200 | 42,500 | |
| 40.62 HHPAA 27.08 PMDA | 0.97 | A | [e] 16 | 47,980 | 47,540 | |
| 25.28 HHPAA 37.92 PMDA | 0.97 | F | [e] 16 | 44,700 | 42,700 | |
| 35 HHPAA 35 MCP | 0.81 | A | [f] 16 | 48,300 | 35,500 | 1.90 |
|  |  |  | [h] 300° F. | 47,100 | 38,100 | |
| 35 HHPAA 35 MCP | 0.81 | D | [f] 16 | 44,700 | 40,500 | 1.81 |
|  |  |  | [h] 300° F. | 49,900 | 41,300 | |
| 40 HHPAA 40 MCP | 0.92 | D | [d] 6 | 53,270 |  | 2.80 |
| 40 HHPAA 40 MCP | 0.92 | D | [d] 17 | 51,100 |  | 2.29 |

Anhydrides: Same as Example 2 with addition of PMDA (pyromellitic dianhydride).
[a] Catalysts at 1% level: A, pyridine; B, benzyldimethyl amine; C, di-isobutyl phenoxy ethoxy ethyl dimethyl benzyl ammonium chloride D,; di-stearyl dimethyl ammonium chloride; E, 2,4,6-tri-(dimethyl aminomethyl)-phenol; F, gamma picoline.
[b] Flexural strength in p.s.i.; I is initial and II is after 2 hours boiling water treatment.
[c] Curing—laminates were press-cured for 30–60 minutes at 250° F. followed by a one hour press cure at 300° F. Post curing was accomplished in a force draft oven at 300° F. for the time designated.
[d] Curing—20 minutes' press-cure at 250° F. followed by post cure in a forced draft oven at 250° F. for the time designated.
[e] Curing—30 minutes' press-cure at 300° F. followed by post cure at 300° F. for the time designated.
[f] Curing—5 minutes' press cure at 325° F. followed by post cure at 250° F. for time designated.
[g] Press cure 45 minutes (275–300° F.) followed by post cure at 250° F. for designated time.
[h] Additional 16 hour cure of cured laminate at temperature designed.

For the production of laminates the press time, in most instances and for the preferred higher temperature resistant compositions, can be decreased by operating at higher temperatures. For example a 400° F. press temperature will decrease the time necessary in the mold to less than 5 minutes after which the laminate may be removed and post cured at the desired temperature.

EXAMPLE X

*Preparation of sheet plastics*

This resin was prepared by mixing 400 parts epoxidized linseed oil (oxirane=8.3%) containing 700 parts per million sodium ions and 7.2 parts catalyst, di-stearyl dimethyl ammonium chloride, heating to approximately 150° F. with stirring. An anhydride mixture of 160 parts monochlorophthalic and 160 parts hexahydrophthalic anhydrides in mole ratio, anhydride/oxirane=.92 was melted and added to the oil.

This blend remained fluid at room temperature and had a pot life of 4–5 days. When the catalyst was omitted the pot life increased to about two weeks. Gel time of the catalyzed mixture at 250° F. was 12 minutes.

Sheet castings, ⅛" thick, formed by curing the cast resin for 16 hours at 250° F. between silicone treated glass surfaces showed a Barcol hardness reading of 17–20.

Rods 0.3 inch in diameter of this material had excellent resistance to a water solution of 10% sodium hydroxide and 50% sulfuric acid. The flex strength of the casting was 7,500 p.s.i. and the heat distortion point was 203° F. Insulation resistance after conditioning at 90% relative humidity at 95° F. for 96 hours was >10⁶ megohms, and at higher temperatures under the same conditions was >10⁶ at 150° F., >10⁶ at 200° F., >10⁶ at 250° F. and 0.4×10⁶ at 300° F. The specific gravity before and after curing was 1.15 and 1.17 respectively.

A 12 ply "Volan A-181" glass cloth laminate, prepared with the above composition and as in Example IX produced a strong panel which had a Barcol hardness of 60 when cured 16 hrs. at 250° F. The panel was sawed and drilled without breaking despite the hardness of the resin material.

When the anhydride blend mentioned above was changed to 80 gm. monochlorophthalic anhydride and 240 gm. hexahydrophthalic anhydride, mole ratio of anhydride/oxirane=0.97, the pot life was doubled to about 9–10 days and the Barcol hardness of representative castings was decreased to about 15.

This change in anhydride proportions effected a decrease in viscosity. This composition was found to be suitable for use with fillers such as powdered aluminum, sand, wood chips, various vegetable flours and hulls, perlite, china clay, alumina, asbestos, marble dust, calcium carbonate, asbestos and glass fibers, and the like, for molding and castings.

The filled plastic was also formed as a sheet casting in a suitable mold.

EXAMPLE XI

Sheet castings ⅛ inch thick were prepared using 80 parts MCP dissolved in 100 parts alkali treated (about 11 parts per million sodium) epoxidized linseed oil (oxirane value 8.3%) in the ratio of anhydride/oxirane=0.85, at about 140° F. with stirring. The reaction was catalyzed with 1% distearyl-dimethyl ammonium chloride and cured for 16 hrs. at 250° F. This cured composition, gave a clear, hard, durable sheet with a Barcol hardness of 22. The specific gravity before and after curing was 1.19 and 1.22 respectively. Cast rods of the same material and of a diameter of about 0.3 inch showed good resistance to water, alkali (10% NaOH) and sulfuric acid (50%). High (>10⁶ megohms) resistivity values are found. The heat distortion point is greater than 215° F.

EXAMPLE XII

Sheet casting ⅛ inch thick were prepared to illustrate the effect of dodecenylsuccinic anhydride (DDSAA) as the hardener in conjunction with 1% distearyl-dimethyl ammonium chloride. To achieve an .87 molar ratio anhydride/oxirane, 120 parts DDSAA were mixed with 100 parts epoxidized linseed oil (oxirane value 8.3%) in which the catalyst was dissolved. The epoxidized oil contained about 700 parts per million sodium.

A 16 hour cure at 250° F. gave a light colored sheet with no Barcol hardness, but it was tough, durable, semi-flexible and showed good resistance to water and solutions at 10% sodium hydroxide and 50% sulfuric acid. Insulation resistance gave values of $>10^6$ megohms, at temperatures up to 250° F. The heat distortion point was 111° F. The pot life of the mixture, at room temperature, was greater than 2 weeks.

EXAMPLE XIII

Effect of shrinkage on curing

Specific gravity data indicates a low degree of shrinkage in the curing process. The following data represents the specific gravity taken at room temperature of the uncured and cured specimens. The data is for 1% distearyl dimethyl ammonium chloride catalyzed epoxidized linseed oil-anhydride systems prepared in the manner previously described. The epoxidized linseed oil in these formulations contained 8.3% oxirane and 11 parts per million sodium.

TABLE 6.—SPECIFIC GRAVITY OF CURED AND UNCURED RESINS

| Anhydride | | Mole Ratio, Anhy./ oxirane | Anhydride, Parts/100 Epoxide | Sp. Gr., Uncured | Sp. Gr., Cured | Approx. Barcol Hardness |
|---|---|---|---|---|---|---|
| Type | Proportions | | | | | |
| MCP | | 80 | 0.85 | 1.19 | 1.22 | 22 |
| MCP/HHPAA | 50/50 | 80 | 0.92 | 1.15 | 1.17 | 18 |
| HET/HHPAA | 50/50 | 115 | 1.02 | 1.21 | 1.23 | 24 |
| HHPAA | | 80 | 1.00 | 1.11 | 1.12 | 20 |
| MNA | | 80 | 0.87 | 1.12 | 1.14 | 10 |
| DDSAA | | 120 | 0.87 | 1.03 | 1.04 | 0 |

EXAMPLE XIV

Physical and electrical properties of plastics

The following data illustrates strength and electrical characteristics of a group of resin mixtures. The resins were formulated using an epoxidized linseed oil containing about 61 parts per million sodium ion and an oxirane value of 8.3%, with 1% distearyl dimethyl ammonium chloride catalyst and the anhydrides as noted and cured for 16–18 hours at 250° F. These data are for the pure unfilled, unreinforced castings.

TABLE 7.—PHYSICAL PROPERTIES OF PLASTICS

| Anhydride | | Parts/100 Epoxide | Ratio, Anhy./ oxirane | Compressive Test | | Flex Tests | |
|---|---|---|---|---|---|---|---|
| Type | Proportions | | | p.s.i. | Modulus ×10⁵ | p.s.i. | Modulus ×10⁵ |
| MCP | | 70 | 0.74 | 12,300 | 1.89 | 10,335 | 2.75 |
| MCP/HHPAA | 50/50 | 70 | 0.81 | 11,487 | 1.97 | 10,913 | 2.87 |
| DDSAA | | 120 | 0.87 | 4,519 | 1.26 | 5,535 | 1.55 |
| HET/HHPAA | 50/50 | 100 | 0.89 | 11,649 | 2.00 | 12,248 | 3.10 |

The compositions were prepared in the manner previously described.

TABLE 8.—ELECTRICAL PROPERTIES OF PLASTICS

| Anhydride | Dielectric Constant | | Power Factor | |
|---|---|---|---|---|
| | A | B | A | B |
| MCP | 3.07 | 3.15 | 0.0136 | 0.0151 |
| MCP/HHPAA | 2.99 | 3.07 | 0.0120 | 0.0136 |
| DDSAA | 2.69 | 2.87 | 0.0119 | 0.0127 |
| HET/HHPAA | 2.89 | 2.96 | 0.0088 | 0.0124 |

(A) Specimens untreated.
(B) After 24 hr. water immersion at 23° C.

EXAMPLE XV

Preparation of a bowling ball

A regulation size bowling ball of about 12 pound weight was formed when the composition below was cured in a proper mold. The mass cured evenly and showed no signs of internal stress or strain. The use of this ball showed that it had a resiliency equivalent to the conventional balls, and did not break or shatter.

The composition used was epoxidized linseed oil with 8.3% oxirane and 11 parts per million sodium ion, cured with a mixture of DDSAA, HHPAA and MNA anhydrides. To 3000 gm. epoxidized linseed oil were added 1800 gm. DDSAA, 600 gm. HHPAA and 600 gm. MNA giving a mole ratio of anhydride/oxirane of 0.90 and 1% distearyl dimethyl ammonium chloride. The solution of the components was clear at 120–140° F. The mixture was cured 5 hr./200° F., 4 hr./220° F. and 10 hr./235° F. This casting was formulated to have a zero Barcol hardness to decrease the brittleness which would be disadvantageous for a large casting.

Similarly, other molded structures as curved, bent and straight rods, hollow tubes, threaded pipe connectors, discs, plates and other molded objects were formed of the above and various other of the described compositions of the examples, as illustrated. The samples cured, as described, without developing internal stress and strains such as would tend to show internal cracks and breakage despite the obtained Barcol hardness on the order as indicated. Further, various of the laminated and molded objects tested did not break when repeatedly dropped on a cement floor and continued to hold their inherent resiliency even when thrown against and bounced against a cement floor.

From the above, it is apparent that modifications and variations of this improvement, as hereinabove set forth, to produce sheeted, laminated and molded forms, may be made without departing from the spirit and scope thereof.

The specific embodiments are given by way of example only and the improvements are limited only by the terms of the appended claims.

We claim:

1. A resinous material comprising essentially the reaction product of substantially 100 parts epoxidized liquid aliphatic higher fatty acid ester material as the major epoxy constituent containing 12–26 carbon atoms in the fatty radical having an iodine value higher than 140 before epoxidation and after epoxidation having a plurality of internal oxirane groups, equivalent to at least about 8% internal oxirane value, said epoxidized ester being neutralized and containing from about 10 parts to 2000 parts per million of a mono-valent alkali metal ion, and the anhydride of a polycarboxylic acid in the molar ratio of about .5 to about 1.2 mole anhydride per mole internal oxirane in said fatty ester.

2. The product of claim 1 wherein, the said ester is an epoxidized linseed oil containing in excess of 8% oxirane.

3. The product of claim 1 wherein, the said ester is an epoxidized triglyceride with at least 8% oxirane.

4. The product of claim 1 wherein, the said ester is an epoxidized long chain vegetable oil substantially free of saturated fatty acid esters and derived from a vegetable oil having an iodine value of over 140 before epoxidation.

5. The product of claim 1 wherein, the said ester is derived from a long chain fatty oil material having a fatty radical of 12–26 carbon atoms having an iodine value higher than 140 before epoxidation and after epoxidation an oxirane value of over 8%.

6. A hard resin material comprising the reaction product of a mixture of substantially 100 parts epoxidized long chain fatty oil material as the major epoxy constituent having a fatty radical of 12–26 carbon atoms having an iodine value higher than 140 before epoxidation and after epoxidation containing an internal oxirane equivalent of from about 8% to about 12%, said epoxidized oil material being neutralized and containing at least 10 parts per million added mono-valent alkali metal ion, and an anhydride of polycarboxylic acid in the ratio of about .5 to about 1.2 mole anhydride per mole oxirane oxygen.

7. A resin composition comprising the reaction product of substantially 100 parts epoxidized higher fatty acid ester material as the major epoxy constituent having an iodine value higher than 140 before epoxidation and after epoxidation having a plurality of internal oxirane groups equivalent to an excess of about 8% oxirane, said epoxidized material being neutralized and containing from 10 to 2000 parts per million mono-valent alkali metal ion, with a mixture of polycarboxylic acid anhydrides present in a mole ratio of about .5 to about 1.2 moles per mole of said oxirane.

8. A resin material consisting essentially of the reaction product of an epoxidized long chain fatty glyceride material present in the proportion of 100 parts epoxidized material and polycarboxylic acid anhydride material, said epoxidized glyceride having an iodine value higher than 140 before epoxidation and after epoxidation having an oxirane value of over 8% internal oxygen and being neutralized and containing at least 10 parts per million mono-valent alkali metal ion selected from the group consisting of sodium, potassium and lithium, and the said polybasic acid anhydride material is selected from the group consisting of saturated and unsaturated aliphatic anhydrides, aromatic anhydrides, heterocyclic anhydrides, cycloaliphatic anhydrides, and mixtures of same contained in the molar ratio of about .5 to about 1.2 mole anhydride per mole of said internal oxirane value.

9. The method of preparing a fatty oil-polybasic carboxylic acid anhydride resin complex having a Barcol hardness of from about 0 to about 60, the steps comprising mixing 100 parts neutralized epoxidized fatty oil base material as the major epoxy constituent containing a fatty radical of 12–26 carbon atoms having an iodine value higher than 140 before epoxidation and after epoxidation having internal oxirane groups equivalent to at least 8% and at least 10 parts per million mono-valent alkali metal ion with a polybasic carboxylic acid anhydride in the molar ratio of about .5 to about 1.2 mole anhydride per mole said oxirane groups, adding a quaternary ammonium salt in a catalytic amount, agitating and blending the mixture at about 120° F. to 180° F., and effecting hardening of the mixture at about 250° F. to about 400° F. in a period of from a few minutes to about 20 hours.

10. The method of preparing a strong hard resinous material from a reaction product comprising essentially 100 parts epoxidized fatty oil as the major epoxy component selected from the group consisting of unsaturated animal, vegetable and marine oils having an iodine value of at least 140 before epoxidation and after epoxidation an internal oxirane value of over 8%, said epoxidized oil having acidic constituents neutralized and containing at least 10 parts per million mono-valent alkali metal ion and a polybasic carboxylic acid anhydride, the steps comprising mixing a said epoxidized fatty oil as the major epoxy component and a polybasic anhydride in the ratio of about .5 to about 1.2 moles anhydride per mole said internal oxirane value, agitating and heating the mixture at a temperature sufficient to stir into a homogeneous mass, curing the homogeneous mass at from normal room temperature to about 400° F., and recovering a strong hard resinous product.

11. In the method of producing a strong hard resin from an epoxidized higher fatty acid ester of substantially 100 parts epoxidized linseed oil material containing before epoxidation unsaturated aliphatic chains and an iodine value higher than 140, the steps comprising mixing a said epoxy ester material, having after epoxidation at least on the order of 8% internal oxirane value, neutralized and containing at least 10 parts per million mono-valent metal ion of group I of the periodic table, with an anhydride of a polybasic carboxylic acid in a ratio of about .5 to about 1.2 moles said anhydride per mole of said oxirane value, agitating and blending the mixture at about normal room temperature to about 180° F., heating and effecting through crosslinking of the said internal oxirane the production of a strong hard thermosetting resin in a period of from a few minutes up to about 20 hours.

12. The method of claim 11 including a catalytic amount of tertiary amine.

13. The method of claim 11 including a catalytic amount of quaternary ammonium halide.

14. The method of claim 11 wherein, the anhydride is a halogenated phthalic acid derived material and the mixture includes a catalytic amount of a tertiary amine.

15. The method of claim 11 wherein, the anhydride is a phthalic acid derived material and including a catalytic amount of a quaternary ammonium compound.

16. The method of claim 11 including a catalytic amount of a boron trifluoride complex.

17. The method of claim 11 wherein, the epoxidized higher fatty ester is an epoxidized fatty glyceride containing a base carbon chain of 18 carbon atoms.

18. The method of preparing a strong hard resin material comprising mixing substantially 100 parts epoxidized higher fatty acid ester as the major epoxy constituent and derived from a long chain unsaturated fatty ester having an iodine value higher than 140 and after epoxidation containing at least about 8% internal oxirane, said ester being neutralized and containing at least 10 parts per million mono-valent alkali metal ion with an anhydride of a polybasic carboxylic acid in a ratio of about .5 to about 1.2 moles said anhydride per mole of said internal oxirane, adding a catalyst in a catalytic amount of about .75% to about 2% based on the said epoxidized fatty ester and said anhydride components, said catalysts being selected from the group consisting of a tertiary amine, a quaternary ammonium compound and a boron trifluoride complex, blending the said mixture, heating the mixture for a period of a few minutes to a few hours at a temperature of about 200° F. to about 400° F., and effecting through crosslinking of the said internal oxirane the production of a strong hard resin.

References Cited in the file of this patent
UNITED STATES PATENTS

| | | |
|---|---|---|
| 2,386,250 | McNally et al. | Oct. 9, 1945 |
| 2,396,129 | Rodman | Mar. 5, 1946 |
| 2,682,515 | Naps | June 29, 1954 |
| 2,752,376 | Julian et al. | June 26, 1956 |
| 2,768,153 | Shokal | Oct. 23, 1956 |